United States Patent [19]
Stanton et al.

[11] Patent Number: 6,123,474
[45] Date of Patent: *Sep. 26, 2000

[54] CONTIGUOUS KEYPAD WITH SETS OF KEYS ON DIFFERENT PLANES

[75] Inventors: Stephen M. Stanton; James Talmage Davis, II, both of Fort Worth; Peter David Iezzi, Keller, all of Tex.

[73] Assignee: Motorola, Inc., Schaumburg, Ill.

[ * ] Notice: Under 35 U.S.C. 154(b), the term of this patent shall be extended for 177 days.

[21] Appl. No.: 08/611,848

[22] Filed: Mar. 8, 1996

[51] Int. Cl.⁷ .................................. B41J 5/08; B41J 5/14
[52] U.S. Cl. ............................ 400/472; 345/169; 341/22
[58] Field of Search .................................. 400/489, 472; 345/168, 169; 341/22

[56] References Cited

U.S. PATENT DOCUMENTS

| | | | |
|---|---|---|---|
| 4,072,486 | 2/1978 | Joseph | 62/131 |
| 4,707,594 | 11/1987 | Roth | 235/488 |
| 5,175,873 | 12/1992 | Goldenberg et al. | 455/89 |
| 5,221,838 | 6/1993 | Gutman et al. | 235/379 |
| 5,422,934 | 6/1995 | Massa | 379/61 |
| 5,465,193 | 11/1995 | Tracy | 362/31 |
| 5,500,643 | 3/1996 | Grant | 400/489 |
| 5,648,771 | 7/1997 | Halgren et al. | 341/22 |
| 6,067,074 | 5/2000 | Leuders | 345/156 |

OTHER PUBLICATIONS

Instruction Manual for Tango; p. 1–38; Nov. 27, 1995; items 10–11 are separate keypads.

*Primary Examiner*—John S. Hilten
*Assistant Examiner*—Daniel J. Colilla
*Attorney, Agent, or Firm*—Pablo Meles

[57] ABSTRACT

A selective call receiver assembly (10) comprises a front housing (14) having a plurality of apertures (15 & 16) and a multiplanar functional keypad (20), wherein the keypad has a first set of keys (23) and a second set of keys (22) residing on a first plane (30) and a third set of keys (21) residing on a second plane (28), the first, second, and third set of keys being integrally formed on one keypad and at least a portion of the first and third set of keys protruding through the plurality of apertures of the front housing when mounted within the front housing.

16 Claims, 3 Drawing Sheets

CONTIGUOUS KEYPAD WITH SETS OF KEYS ON DIFFERENT PLANES

FIELD OF THE INVENTION

This invention relates in general to keypad arrangements and more specifically to an integral keypad having keys on multiple planes.

BACKGROUND OF THE INVENTION

Keys that reside in different locations within a single plane might use separate keypads. Conventionally, if the form of activation for the keys on the same plane are different, then a separate keypad would be used for each form of activation. Finally, if the keys reside on separate planes, there is a separate keypad for each plane of activation. Thus, a product requiring the use of keys in multiple locations, with multiple means of activation, and in multiple planes would require the use of more than one keypad.

Market forces with respect to portable communication products continue to drive product cost and size down. Use of multiple keypads poses a barrier to further reducing material and manufacturing costs down. But, product functionality may still require that there be keys that are on multiple planes, or in different locations, or with different activation methods or any combination of plane, location or activation. Thus, there exists a need for a single integral keypad that would activate keys residing in different locations, on different planes, and using different means of activation.

SUMMARY OF THE INVENTION

In a first aspect of the present invention, a multiplanar functional keypad comprises a first set of keys residing on a first plane and a second set of keys residing on a second plane, the first set of keys and the second set of keys are all integrally coupled to form the multiplanar functional keypad.

In another aspect of the present invention, a selective call receiver assembly comprises a front housing having a plurality of apertures and a multiplanar functional keypad, wherein the keypad has a first set of keys and a second set of keys residing on a first plane and a third set of keys residing on a second plane, the first, second, and third set of keys being integrally formed on one keypad and at least a portion of the first and third set of keys protruding through the plurality of apertures of the front housing when mounted within the front housing.

DESCRIPTION OF THE PREFERRED EMBODIMENT

Figure 1:
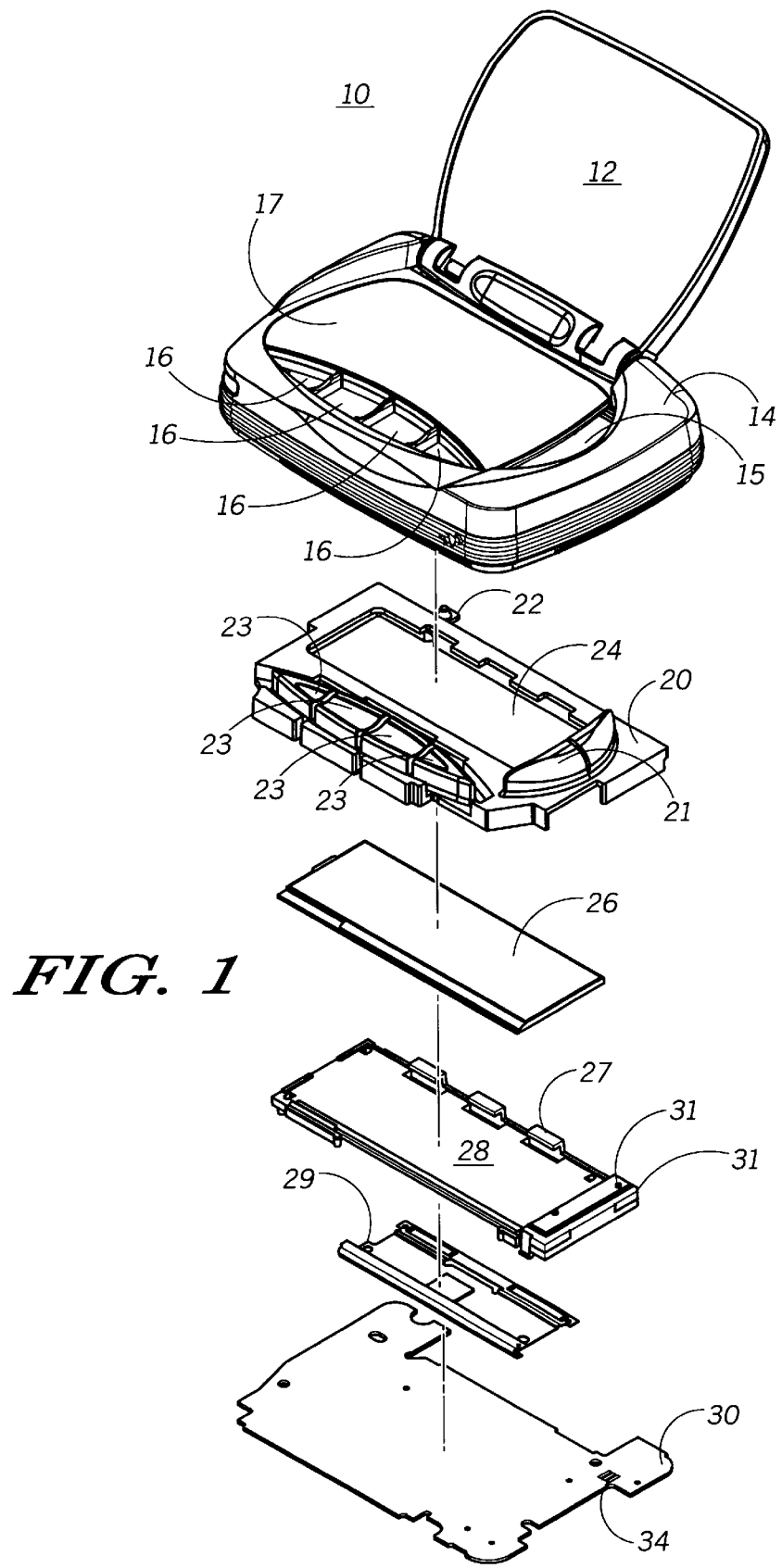
FIG. 1 is an exploded view of a selective call receiver assembly in accordance with the present invention.

Referring to FIG. 1, a selective call receiver assembly 10 is shown comprising a front housing 14 having a plurality of apertures 15, 16 and 17. A multiplanar functional keypad 20 is preferably mounted into the front housing 14, wherein the keypad 20 has a first set of keys 23 and a second set of keys 22 residing on a first plane (30) and a third set of keys 21 residing on a second plane (28), the first, second, and third set of keys being integrally formed on one contiguous keypad and at least a portion of the first and third set of key (23 and 21) protruding through the plurality of apertures 15 and 16 when mounted within the front housing 14. The selective call receiver assembly 10 further comprises a flap 12 coupled to the front housing 14. The flap 12 activates the second set of keys 22 when the flap 12 is placed in an opened position.

Figure 2:
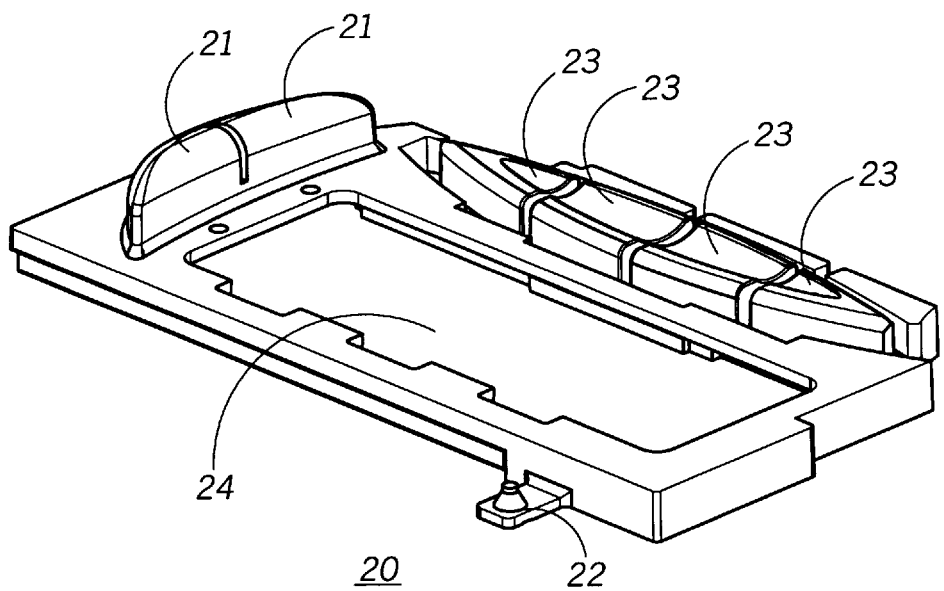
FIG. 2 is a perspective view of a multiplanar functional keypad in accordance with the present invention.
Figure 3:
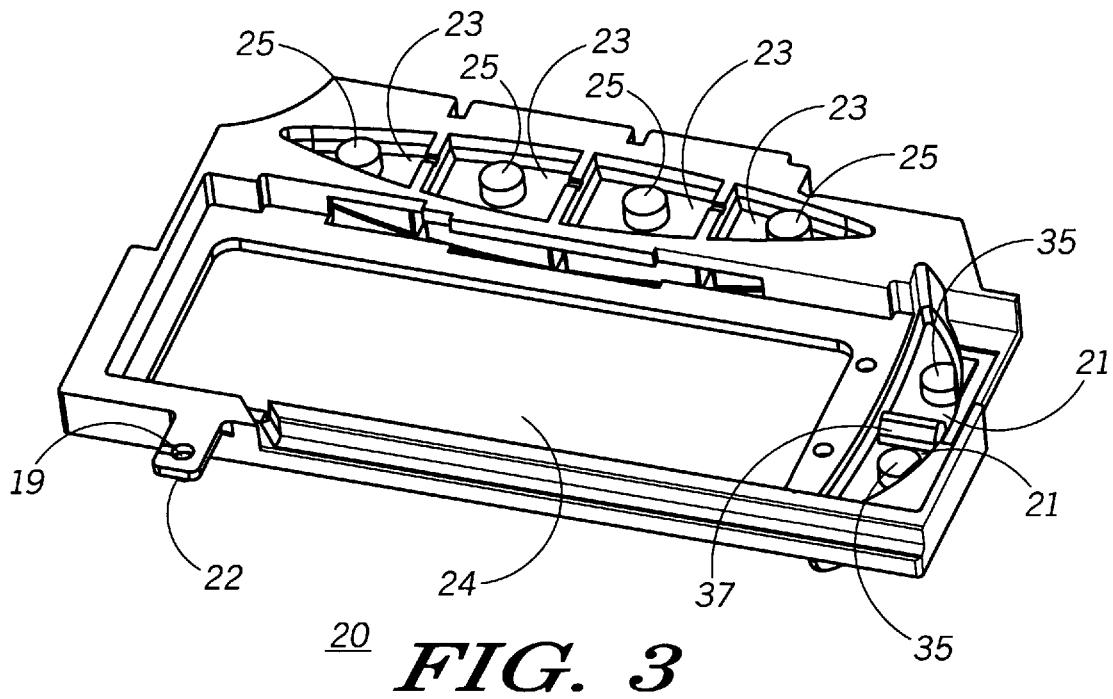
FIG. 3 is another perspective view of the multiplanar functional keypad in accordance with the present invention.

Preferably, the first set of keys 23 comprises a set of 4 push keys, the second set of keys 22 comprises a single push key that is activated by the flap 12, and the third set of keys 21 comprises two keys residing under and forming a part of a rocker switch as will become more apparent from FIGS. 2 and 3. The single key (22) preferably protrudes through an opening (not shown) in the front housing 14, wherein an actuator integrally coupled to the flap 12 depresses the key 22 when flap 12 is placed in an opened position.

Figure 1A:
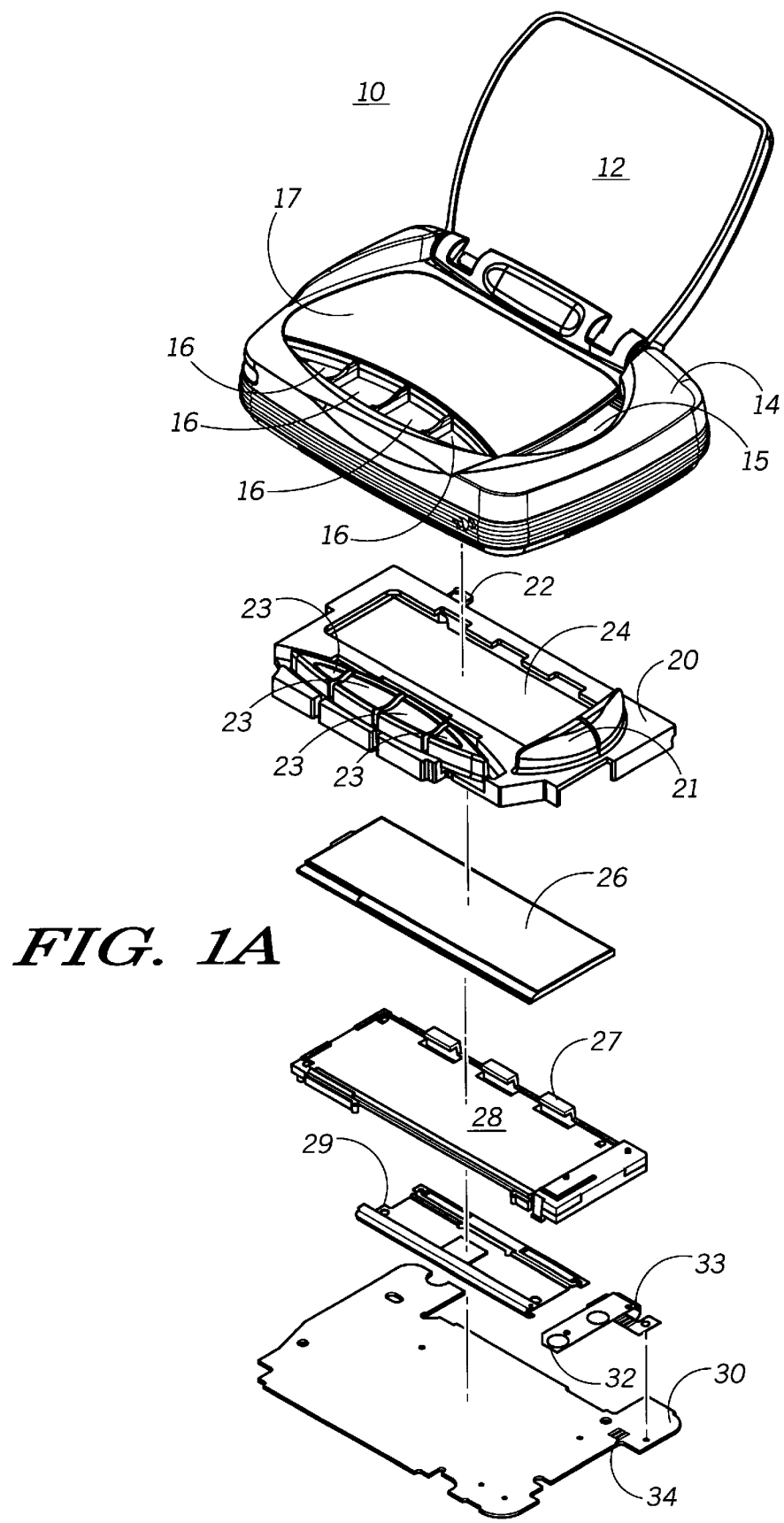
FIG. 1A is an alternative exploded view of a selective call receiver assembly in accordance with the present invention.

The selective call receiver assembly 10 further comprises a liquid crystal display 26 mounted within the multiplanar functional keypad so that the LCD (26) can be seen through the aperture 17. Preferably, the liquid crystal display 26 is mounted within a light pipe (serving as the second plane 28) before mounting the two piece assembly (26 and 28) within the area 24 of the keypad 20. The light pipe which is used for back lighting the LCD preferably uses a plurality of integrally formed hooks 27 for retaining the LCD in place. The light pipe also may include a plurality of contacts and runners 31 that are used by the third set of keys 21 as contact points on a second plane, the first plane 30 being a control printed circuit board described below. The contacts and runners 31 could be wrap-around screen printed on to the light pipe as shown so as to provide the connections between the set of keys 21 and the control printed circuit board. Alternatively, a flex circuit 32 with runners 33 coupled to the control printed circuit board via pad 34 serves as the means for coupling the third set of keys 21 to the control printed circuit board as shown in FIG. 1A. In either case, the surface of the light pipe serves as the second plane where the second set of keys might contact either the flex circuit 32 or the contacts and runners 31 that could be placed directly onto the light pipe.

The control printed circuit board serves as the direct contact point for the first and second set of keys (23 and 22 respectively) on a first plane. In other words, the control printed circuit board serves as the first plane 30. As part of the selective call receiver assembly 10, the control printed circuit board provides the electrical functionality corresponding to a sequence pressed on the multiplanar functional keypad. As shown, the board 30 may optionally include a flex circuit 29 that could be used to carry circuits for driving the liquid crystal display 26. Alternatively, the functionality of the circuits on the flex circuit 29 can be reconfigured to reside on the control printed circuit board.

Referring to FIGS. 1, 2 and 3, the multiplanar functional keypad 20 preferably comprises an elastomeric material having a plurality of keys (21, 22, and 23) with conductive material (19, 25, and 35) for activating a circuit on substrates residing on multiple planes. The conductive material can be carbon ink pads or any appropriate conductive material commonly used with keypads. More specifically, the keypad comprises a first set 23 of push keys and a second set 22 of push keys, the first and second set of push keys residing on a first plane. In FIG. 3, one can clearly note that when keys 23 and keys 22 are depressed, the conductive material (25 and 19 respectively) would contact the same plane. Whereas, the conductive material 35 of the third set 21 of keys contact another plane when they are depressed by the rocker switch which rocks about a pivot 37. The rocker switch can activate each of a pair of keys below it that are split by the pivot of the rocker switch.

As described above, the first, second and third set of keys all are integrally coupled to form a multiplanar functional keypad. In addition, the keypad further forms a seal and shock pad for a liquid crystal display. It should also be understood that the embodiments disclosed are merely examples and the invention is not restricted thereto. For example, the multiplanar functional keypad could comprise only a first set of keys 23 on a first plane and a second set of keys 21 on a second plane, wherein the first and second set of keys are integrally coupled to form the multiplanar functional keypad. The first and second set of keys could be both activated using the same mechanisms such as a key depression or they could be activated by different mechanisms, i.e., one key depression and one rocker switch. It will be understood by those skilled in the art that variations and modifications can be made within the scope and spirit of the present invention as defined by the appended claims.

What is claimed is:

1. A multiplanar functional keypad for use with a device having a circuit on a substrate on a first plane and having a circuit on a substrate on a second plane, comprising:

a first set of keys and a second set keys for activating the circuit on the substrate residing on the first plane; and a third set of keys for activating the circuit on the substrate residing on the second plane, said first set of keys, second set of keys and third set of keys all integrally formed on one contiguous keypad, the multiplanar functional keypad.

2. The multiplanar functional keypad of claim 1, wherein the first set of keys comprises a set of push keys.

3. The multiplanar functional keypad of claim 1, wherein the second set of keys comprises a single push key.

4. The multiplanar functional keypad of claim 1, wherein the third set of keys comprises a pair of keys under a rocker switch that forms a portion of the device.

5. A selective call receiver assembly having a first plane and a second plane, comprising:

a front housing having a plurality of apertures; and a multiplanar functional keypad, wherein the keypad has a first set of keys and a second set of keys residing on the first plane and a third set of keys residing on the second plane, the first, second, and third set of keys being integrally formed on one contiguous keypad and at least a portion of the first and third set of keys protruding through the plurality of apertures of the front housing when mounted within the front housing.

6. The selective call receiver assembly of claim 5, wherein the assembly further comprises a liquid crystal display mounted with in the multiplanar functional keypad.

7. The selective call receiver assembly of claim 5, wherein the assembly further comprises a flap coupled to the front housing, that activates the second set of keys when flap is placed in an opened position.

8. The selective call receiver assembly of claim 6, wherein the assembly further comprises a light pipe for back lighting the liquid crystal display.

9. The selective call receiver assembly of claim 5, wherein the assembly further comprises a control printed circuit board that provides the electrical functionality corresponding to a sequence pressed on the multiplanar functional keypad.

10. The selective call receiver assembly of claim 5, wherein the first set of keys comprises a set of 4 push keys, the second set of keys comprises a single key that is activated when a flap coupled to the front housing is placed in an opened position, and wherein the third set of keys comprises two keys residing under a rocker switch of the selective call receiver assembly.

11. A multiplanar functional keypad for use with an electronic device, comprising:

an elastomeric material having a plurality of keys with a conductive material for activating a circuit on a substrate residing on multiple planes, wherein the plurality of keys comprises:

a first set of push keys and a second set of push keys, the first and second set of push keys for activating a circuit residing on a first plane; and a third set of keys for activating a circuit residing on a second plane, said first set of keys, second set of keys and third set of keys all integrally formed on one contiguous keypad, the multiplanar functional keypad.

12. The multiplanar functional keypad of claim 11, wherein the conductive material comprises carbon ink pads.

13. The multiplanar functional keypad of claim 11, wherein the second set of keys comprises a single push key.

14. The multiplanar functional keypad of claim 11, wherein the third set of keys comprises a pair of keys residing under a rocker switch of the electronic device, each of the keys of the pair being split by a pivot point of the rocker switch.

15. The multiplanar functional keypad of claim 11, wherein the substrate comprises a printed circuit board.

16. A multiplanar functional keypad, comprising:

a first set of keys residing on a first plane of the multiplanar functional keypadl; and a second set of keys residing on a second plane of the multiplanar functional keypad, the first set of keys and the second set of keys all integrally formed on one contiguous keypad, the multiplanar functional keypad.

* * * * *